Feb. 14, 1956  H. C. GILLESPIE ET AL  2,734,982
DIELECTRIC HEATING ELECTRODE
Filed Sept. 28, 1951
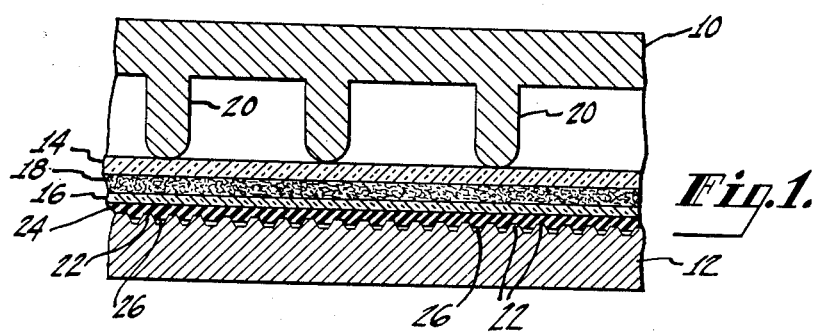
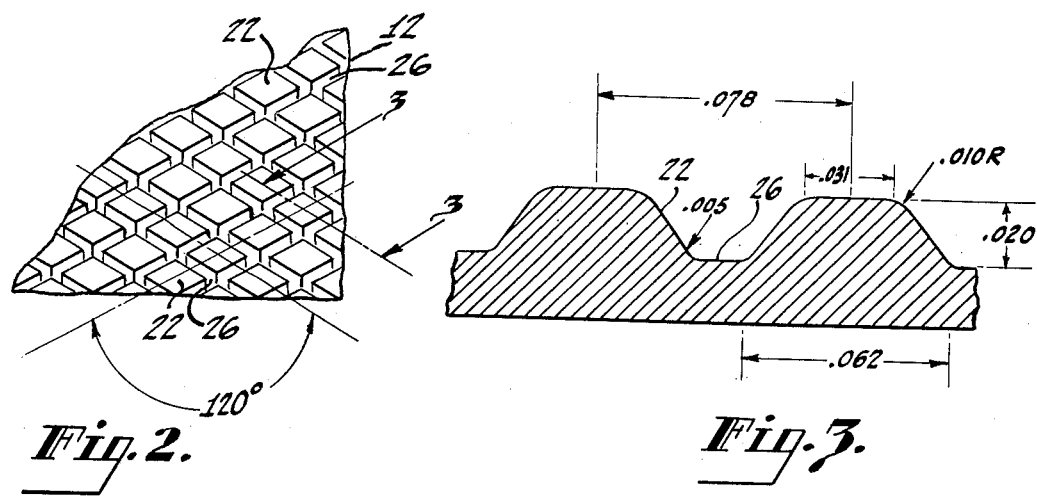
INVENTORS
HENDERSON C. GILLESPIE &
JOSEPH E. JOY
BY
ATTORNEY

United States Patent Office 2,734,982
Patented Feb. 14, 1956

2,734,982
DIELECTRIC HEATING ELECTRODE

Henderson C. Gillespie, Moorestown, and Joseph E. Joy, Collingswood, N. J., assignors to Radio Corporation of America, a corporation of Delaware Application September 28, 1951, Serial No. 248,798

5 Claims. (Cl. 219—10.81)

This invention relates to high frequency dielectric heating apparatus and more particularly to an improvement in electrodes for use in such apparatus.

A material now finding popular use for furniture upholstery or for auto seat covers, consists of two thermoplastic layers such as vinyl films separated by a batting material such as cotton. These layers of material are usually bonded together by high frequency dielectric heating apparatus. The materials are usually given a quilted effect by making one of the electrodes with narrow ridges over its bonding surface. Bonding only occurs at the ridges. The remainder of the material between the bonds puffs up to give the impression of thickness. The narrow electrode ridges are widely spaced and patterned in a diamond shape to provide the well known quilting pattern.

It will be appreciated that there is a rigid requirement for a good strong bond for this material, since, in view of the wide spacing between bonds as well as the narrowness of the bond areas, each bond is subject to large stresses. Electrodes ordinarily used in the high frequency heat sealing of thermoplastic materials, such as vinyl films, normally employ flat smooth surfaces to insure intimate contact over the area being sealed. It was found, however, that when bonding the above described material, consisting of a batting material between two thermoplastic films to produce a quilting effect, the use of a flat electrode for such bonding requires considerably higher pressures than ordinarily used in order to force the thermoplastic material to flow around and between the cotton fibres so that they can adhere together. It was further found that even with high pressures, the resulting bond or seal is weak, the thermoplastic material may be cut by the electrode edge at the edge of the seal and in general a very poorly bonded material results.

It is an object of this invention to provide an improved electrode for dielectric heat sealing which enables firm and inseparable bonding of a material composed of a batting material separated by two thermoplastic sheets.

It is a further object of this invention to provide a novel and improved electrode for dielectric heat sealing apparatus.

These and further objects of the present invention are achieved by employing, in apparatus for bonding together two sheets of thermoplastic material separated by a batting material, an electrode having a plurality of small protrusions providing a pebbled or knurled working face. Each knurl has its working surface blunted and its corners rounded in order not to cut the material being bonded. The grooves between the knurls are made to have a depth such that they will not fill with material when the knurled electrode is applied, with pressure, to the material being bonded.

The novel features of the invention as well as the invention itself, both as to its organization and method of operation, will be best understood from the following description, when read in connection with the accompanying drawings in which, Figure 1 is a sectional view of two electrodes being applied to bond two thermoplastic layers, separated by a batting material, one of said electrodes being an embodiment of the invention, Figure 2 is a perspective view of the working surface of an electrode which is an embodiment of the invention, and Figure 3 is an enlarged cross-section of the knurls on the surface of the electrode shown in Figure 2.

Referring now to Figure 1, there is shown a sectional view of a pair of electrodes 10, 12 applying simultaneously radio frequency heat and pressure to a material composed of two layers 14, 16 of a thermoplastic material such as vinyl plastic, separated by a batting material 18 such as cotton batting or wool batting. One electrode 10 is used to provide the pattern for the material so that it resembles quilting. This is done by shaping the working face of the electrode to have ridges 20 in a diamond or quilted pattern and to cut away the electrode material from the remainder of the surface. The layer of vinyl plastic 14 presented to the ridges 20 is usually thicker than the other layer enclosing the batting material, but this does not necessarily have to be so.

The lower electrode 12 has a surface from which a plurality of small protrusions 22 extend, thus presenting a pebbled or knurled working face. A thin sheet of rubber 24 is placed between the pebbled face and the thin vinyl film 16. The reason for this is that, as the vinyl film heats up, in view of the fact that it is presented to a metal electrode, the heat may be conducted away so rapidly that the film will not become plastic. The rubber film acts to prevent the heat from being conducted away from the vinyl film too rapidly. Other non-thermoplastic thermal insulating material than rubber may be used.

The pebbled surface of the electrode 12 serves to provide for the material contact surface of the upper electrode a multiplicity of small, high pressure areas at which the radio frequency power concentration is a great deal higher than in the valleys 26 between the pebbles or knurls 22. The higher temperature produced at the knurl, as a result of the power concentration there, together with the high pressure produced as the result of the application of the same pressures usually used being applied to the work over a much smaller area, causes a more perfect union and more complete flow of the two sheets of thermoplastic 14, 16 through the batting 18 at the areas of operations. The grooves 26 between the knurls or protrusions 22 on the lower electrode are made to exceed the total thickness of the material being bonded. The reason for this is, otherwise the material, when pressure is applied by the electrodes, will fill in the grooves and thus negative the effect of knurling the working face of the electrode.

Heretofore, in place of a knurled face electrode, a plane face electrode was used. The welds provided as a result were weak and ineffective. Increasing the pressure in order to obtain more perfect welding and contact between the two layers of thermoplastic material did not have the desired effect. The weld was still poor and the plastic was cut at the edges of the seal. The present system results in a weld of such strength that, when an effort is made to separate the two sets of plastic, the plastic tears before the weld separates.

Referring now to Figure 2, there is shown, in perspective, a view of the working face of the knurled electrode 12. The knurls 22 are given the shape of a quadrilateral parallelogram in order that as many of the knurls and as closely spaced a number of them as can be possibly obtained is provided. This, however, is not to be taken as a limitation upon the invention since other shapes such as square and round may be given to the knurls and still the indicated desirable results may be effectuated.

Referring now to Figure 3, a cross-section of the knurls 22, shown on the electrode 12, may be seen. As an illustration of a practical embodiment of the invention but not to be construed as any limitation thereon, dimensions are provided for the welding of a material having an overall thickness of .016 of an inch. It may be seen that the working face of the knurl is flattened in order to prevent perforation of the material when pressure is applied. The base of each knurl is approximately twice as wide as its top or working surface. In Fig. 3, for example, the base is .062 inch wide while the working top or surface is .031 inch wide. The corners of the top or working surface are broken or rounded. In Fig. 3, the top corners are rounded to a radius of .010 inch. Each knurl, therefore, is formed as a truncated pyramid having rounded corners and the grooves therebetween have outward slanting sides. The lower corners of the groove are also rounded. The combination of these shapes prevents the material from being cut as it is being bonded. In place of having a separate thin sheet of rubber between the knurled electrode and the vinyl film, a coating of rubber may be applied to the electrode by an anodizing process.

There has been herein described and shown a novel, useful electrode for dielectric heat sealing which enables a firm and substantially inseparable bond to be made in material which is composed of a batting material separated by two thermoplastic sheets.

What is claimed is:

1. An electrode for use in radio frequency heat sealing having as part of the conductive electrode body a plurality of small protuberances extending outwardly from the main body of the electrode to provide a pebbled working face, the area of the working surface of each protuberance being small compared to the area of the electrode and said working surface of each protuberance having rounded corners.

2. An electrode for use in radio frequency heat sealing having part of the conductive electrode body fashioned with a knurled working face, each knurl having its working surface substantially flattened, the grooves between the knurls having a sufficient depth to prevent filling by the materials to which said electrode is applied, the walls of said grooves being slanted outward and the corners of said knurls and said grooves being rounded to prevent cutting of the thermoplastic material as it is being bonded.

3. In apparatus for the radio frequency sealing of two sheets of thermoplastic material separated by a layer of batting material, the combination of a pair of electrodes for effecting said sealing, one of said electrodes having a part of its conductive electrode body finished with a knurled working face, each knurl having its working surface finished to provide in cross section a continuous pattern of truncated pyramids having rounded corners to prevent penetration of said materials, the other of said electrodes having its working face patterned in accordance with the design desired to be imparted to said material, the working face of each knurl being made sufficiently small to enable a plurality of them to oppose the material contact surface of the configuration on the working face of said other electrode.

4. In apparatus for the radio frequency sealing of two sheets of thermoplastic material separated by a layer of batting material, the combination of a pair of electrodes for effecting said sealing, one of said electrodes having its working face knurled, each knurl having its working surface substantially flattened and its corners rounded, the grooves between the knurls having a depth in excess of the thickness of the materials being sealed and its walls slanted outward from a rounded union with its base, the other of said electrodes having its working face patterned in accordance with the configuration desired to be imparted to said thermoplastic material.

5. The combination of a pair of electrodes as recited in claim 4 wherein the knurls on said one electrode are shaped to have substantially in plane view the cross-sectional area of a quadrilateral parallelogram, and the size of each of said knurls is made sufficiently small to enable a plurality of them to oppose the material contact surface of the configuration on the working face of said other electrode.

References Cited in the file of this patent

UNITED STATES PATENTS

| | | |
|---|---|---|
| 1,303,919 | Lachman | May 20, 1919 |
| 2,376,253 | Humphrey | May 15, 1945 |
| 2,460,460 | Langer | Feb. 1, 1949 |
| 2,474,977 | Hart | July 5, 1949 |
| 2,564,397 | Duddy | Aug. 14, 1951 |
| 2,580,200 | Shrimpton | Dec. 25, 1951 |
| 2,621,138 | Messing | Dec. 9, 1952 |

FOREIGN PATENTS

| | | |
|---|---|---|
| 621,099 | Great Britain | Apr. 4, 1949 |
| 632,690 | Great Britain | Nov. 28, 1949 |